US009540167B2

(12) United States Patent
Zweed (10) Patent No.: US 9,540,167 B2
(45) Date of Patent: Jan. 10, 2017

(54) CAPSULE, DEVICE AND METHOD FOR PREPARING A BEVERAGE BY EXTRACTION (75) Inventor: Sander Gordon Zweed, Bussum (NL)

(73) Assignee: Biserkon Holdings Ltd., Nicosia (CY)

(*) Notice: Subject to any disclaimer, the term of this patent is extended or adjusted under 35 U.S.C. 154(b) by 546 days.

(21) Appl. No.: 14/002,952

(22) PCT Filed: Dec. 15, 2011

(86) PCT No.: PCT/NL2011/050853
§ 371 (c)(1),
(2), (4) Date: Feb. 6, 2014

(87) PCT Pub. No.: WO2012/118367
PCT Pub. Date: Sep. 7, 2012

(65) Prior Publication Data
US 2014/0170281 A1    Jun. 19, 2014

(30) Foreign Application Priority Data

Mar. 3, 2011  (NL) ...................................... 2006338

(51) Int. Cl.
*B65D 85/804* (2006.01)
*B65D 53/02* (2006.01)
*A47J 31/06* (2006.01)
*A47J 31/44* (2006.01)
*A47J 36/00* (2006.01)

(52) U.S. Cl.
CPC ........ *B65D 85/8043* (2013.01); *A47J 31/0684* (2013.01); *A47J 31/44* (2013.01); *A47J 31/4492* (2013.01); *A47J 36/00* (2013.01); *B65D 53/02* (2013.01)

(58) Field of Classification Search
CPC ...... B65D 85/8043; B65D 53/02; A47J 31/02; A47J 31/0684; A47J 31/44; A47J 31/4492; A47J 36/00
See application file for complete search history.

(56) References Cited

U.S. PATENT DOCUMENTS

| 2,117,807 | A | 5/1938 | Jesser |
| 3,923,197 | A | 12/1975 | Kuhn |
| 6,268,438 | B1* | 7/2001 | Ellul ...................... C08L 23/12 |
| | | | 502/113 |
| 2002/0195455 | A1 | 12/2002 | Takahashi et al. |
| 2006/0110507 | A1* | 5/2006 | Yoakim ............... B65D 85/8043 |
| | | | 426/433 |
| 2006/0219098 | A1 | 10/2006 | Mandralis et al. |
| 2007/0224319 | A1 | 9/2007 | Yoakim et al. |

(Continued)

FOREIGN PATENT DOCUMENTS

| EP | 0472946 A2 | 3/1992 |
| EP | 0512468 A1 | 11/1992 |

(Continued)

*Primary Examiner* — Erik Kashnikow
*Assistant Examiner* — Chaim Smith
(74) *Attorney, Agent, or Firm* — The Webb Law Firm (57) ABSTRACT The invention relates to a capsule for use in a device for preparing beverage said capsule being provided with a sealing element comprising a cavity. The invention also relates to an assembly of such a capsule and a device for preparing beverages. The invention further relates to a method for preparing beverages by making use of such an assembly.

30 Claims, 6 Drawing Sheets (56) References Cited

U.S. PATENT DOCUMENTS

| | | |
|---|---|---|
| 2009/0280219 A1 | 11/2009 | Yoakim et al. |
| 2011/0185910 A1 | 8/2011 | Ryser |
| 2012/0251694 A1 | 10/2012 | Kamerbeek et al. |

FOREIGN PATENT DOCUMENTS

| | | | |
|---|---|---|---|
| EP | 0770106 A1 | 5/1997 | |
| EP | 2284101 A1 | 2/2011 | |
| FR | 1538954 A | 9/1968 | |
| GB | 2116154 A | 9/1983 | |
| JP | 60231068 A | 11/1985 | |
| WO | 2010137954 A1 | 12/2010 | |
| WO | WO 2010/137946 | * 12/2010 | ......... B65D 85/8043 |
| WO | WO 2010/137947 | * 12/2010 | ......... B65D 85/8043 |

\* cited by examiner

CAPSULE, DEVICE AND METHOD FOR PREPARING A BEVERAGE BY EXTRACTION

CROSS-REFERENCE TO RELATED APPLICATIONS

This application is the United States national phase of International Application No. PCT/NL2011/050853 filed Dec. 15, 2011, and claims priority to The Netherlands Patent Application No. 2006338, filed Mar. 3, 2011, the disclosures of which are hereby incorporated by reference in their entireties.

BACKGROUND OF THE INVENTION

Field of the Invention

The invention relates to a capsule for use in a device for preparing beverages. The invention also relates to an assembly of such a capsule and a device for preparing beverages. In addition, the invention relates to a perforation structure evidently intended for use in such a capsule according to the invention. The invention also relates to the use of such a capsule in a device for preparing beverages. The invention further relates to a sealing element for use in a capsule according to the invention.

Description of Related Art

Diverse capsules for use in a device for preparing beverages are known in the prior art. A known capsule as described for instance in EP 0512468 comprises a housing provided with a perforable supply side for injecting a liquid into the housing and with a discharge side located at a distance from the supply side and provided with an opening for the purpose of discharging liquid injected into the housing, a quantity of substance for extraction received in the housing, such as ground coffee beans, and a pierceable foil connected to the housing and sealing the opening located on the discharge side. This known capsule can be placed in a device for preparing a beverage. The capsule is placed for this purpose in a receiving space of a capsule holder of the device. The capsule is clampingly supported here in the receiving space by a support and a clamp. The supply side of a housing of the capsule is perforated by subsequently moving a liquid injector through the housing of the capsule, and a relatively hot liquid, in particular water, can be introduced into the housing under a relatively high pressure, generally of between 15 and 20 bar. The foil is perforated by moving a perforation plate forming part of the capsule holder and the capsule toward each other and the extracted liquid flows via the perforation plate into a beverage container. Because of the relatively high operating pressure a space between the capsule and capsule holder will generally be filled with a sealing element. In the case the sealing connection does not function in the correct manner and water flows outside the capsule, insufficient pressure will be developed inside the capsule to cause tearing of the foil or the pressure will not tear the foil completely, and this can impede the extraction process considerably. It is possible here to envisage providing the capsule holder with a sealing element in order to realize sealing. It is however generally more advantageous to provide the capsule with a sealing element, whereby the sealing element is used only once, whereby improved operation of the sealing element can be guaranteed. The European patent EP 1654966 describes a capsule which is provided on an outer side with a sealing element manufactured from a rubber-elastic material, in particular silicone rubber. Although the material properties of rubber-elastic materials are favourable for sealing engagement on the capsule holder, such rubber-elastic materials are found to be relatively difficult to produce, and it is moreover relatively difficult to attach the rubber-elastic sealing element to the capsule by means of welding. If the sealing element is insufficiently adhered to the capsule during welding, one or more leakages can occur between the sealing element and the capsule, which can result in leakage(s) during the extraction process. The sealing action of the capsule known from EP 1654966 is moreover greatly dependent on the shaping of the capsule holder and on possible damage to the rubber of the capsule.

An object of the invention is to provide an improved capsule with which at least one of the above stated drawbacks can be obviated.

A further object of the invention is to provide a capsule with an improved sealing element.

SUMMARY OF THE INVENTION

The invention provides for this purpose a capsule of the type stated in the preamble, comprising: a housing at least partially filled with a substance to be extracted and/or dissolved, such as ground coffee, wherein the housing is provided with a supply side for pressing a liquid such as water into the capsule, and with a discharge side located a distance from the supply side for discharging liquid provided with extract and/or dissolved substance and guided through the capsule, wherein the supply side and/or at least a part of the discharge side of the housing is initially sealed by a perforable foil; a laterally protruding engaging edge connected to the housing to enable clamping of the capsule in a capsule holder of a device for preparing beverages; and at least one resilient sealing element arranged at least on the engaging edge and/or the housing for sealing a space between the capsule holder and the capsule during clamping of the capsule in the device, wherein the sealing element encloses at least a part of at least one absorption cavity. Applying a resilient sealing element which at least partially encloses one or more absorption cavities imparts to the sealing element an improved capacity for deforming during clamping of the capsule in the capsule holder. The absorption cavity facilitates deformation, as a consequence of which the sealing element can curve more easily round a clamping edge of the capsule holder, whereby the sealing element in fact engages around the clamping edge on one or two sides, depending on the shape of the sealing element. This engagement round the clamping edge of the capsule holder by the sealing element of the capsule improves the sealing capacity of the sealing element, and thereby of the capsule, in significant manner and makes the sealing capacity considerably less dependent on the shape of the clamping edge of the capsule holder. The absorption cavity therefore functions as cushion and as (temporary) receiving space (absorption space) for the resilient material as soon as a load is exerted on the sealing element. The absorption cavity is filled with a substance other than the resilient material from which the sealing element is substantially manufactured. The absorption cavity will generally be filled with air, liquid and/or gel. For the purpose of realizing a desired deformation of the sealing element it is possible to envisage the sealing element being provided with at least one weakening zone, a variable wall thickness and/or a particular shape, whereby the desired deformation can already be predetermined.

It is possible to envisage at least one absorption cavity being enclosed by the sealing element and the engaging edge and/or the housing. It is also possible to envisage at least one absorption cavity being substantially wholly enclosed by the sealing element. The absorption cavity can here take a substantially closed (airtight or liquid-tight) form, wherein no exchange is possible between the content of the absorption cavity and the ambient atmosphere, whereby a closed cushion is formed. The closed absorption cavity will generally be filled here with air or another gas. It is also possible to envisage a liquid, in particular water, or a gel being applied as filling for the absorption cavity/cavities. In an alternative embodiment of the absorption cavity the absorption takes an open form, whereby communication is possible between the content of the absorption cavity and the ambient atmosphere. In this latter embodiment the absorption cavity will generally be filled with air. When the sealing element is loaded, the air will be at least partially pressed out of the absorption cavity, this facilitating deformation of the sealing element.

The absorption cavity can be formed by an elongate groove, and in particular extends annularly. The shape of the absorption cavity hereby follows the shape of the sealing element as such. It is also possible to envisage the absorption cavity being given a bubble-like form. When a plurality of open, bubble-like absorption cavities are applied, and particularly wherein they are mutually connected, a resilient porous structure is in fact formed in the sealing element.

In addition to the use of one or more absorption cavities, it is also possible to envisage a side of the sealing element remote from the engaging edge being provided with at least one protruding edge. The protruding edge here forms a dam (barrier) enabling further prevention of liquid leakage from the capsule holder. The edge preferably has an annular shape here and follows the shape of the sealing element as such. It is possible to envisage a side of the sealing element remote from the engaging edge being provided with a plurality of protruding edges. The edges are preferably oriented concentrically relative to each other.

The capsule can comprise one or more sealing elements. When the capsule comprises a plurality of sealing elements, it is then possible to envisage the sealing elements engaging each other and optionally being connected to each other, in particular by means of a weld connection. It is however also possible here to envisage the sealing elements being positioned at a distance from each other, wherein for instance one sealing element is connected to and/or forms part of the engaging edge and another sealing element is connected to and/or forms part of the housing, whereby a multiple seal is realized during the extraction process of the capsule placed and clamped in a capsule holder. The one or more sealing elements will generally be positioned on an outer side (i.e. a side facing toward the device) of the housing and/or the engaging edge.

The sealing element is preferably at least partially manufactured from a thermoplastic polyolefin (TPO). The advantage of a TPO is that a TPO is also flexible but, in contrast to a rubber elastomer, comprises relatively few cross-links, whereby a TPO softens considerably more at increased temperature (welding temperature) than a rubber elastomer which is of thermosetting character and does not soften, or hardly so, due to a large number of cross-links. This more intensive softening enables better fusing of the sealing element with another part of the capsule during a (thermal or ultrasonic) welding process, whereby the forming of gaps between the sealing element and another part of the capsule can be prevented, this enhancing the eventual extraction process. It is particularly advantageous here for the capsule part to which the sealing element is connected to be manufactured from plastic, and preferably a polyolefin such as polypropylene, which enhances the mutual fusing during welding, and therefore the mutual adhesion of the two components. Welding is otherwise preferred to adhesion, since no additional adhesive means are required, this being particularly advantageous from an economic and logistic viewpoint and from the viewpoint of environmental-friendliness. A further advantage of applying a TPO is that manufacture of a TPO is quicker and easier than that of a thermosetting elastomer (rubber elastomer) which is manufactured in three lengthy steps (mixing, injection moulding and cross-linking). Other than thermosetting polymers, TPOs can moreover be wholly or partially recycled, this being particularly advantageous from the viewpoint of environmental-friendliness. The TPO from which the sealing element is at least partially manufactured preferably comprises polypropylene. Since the housing and/or a part of the foil facing toward the sealing element is generally also manufactured from polypropylene, an excellent welded connection can be realized between the sealing element on the one hand and the housing and/or the foil on the other. The sealing element more preferably comprises a composition of polyolefins, the composition comprising: polypropylene and an elastomeric copolymer comprising units of ethylene and units of an $\forall$-olefin, which may also be written as $\alpha$-olefin. The $\forall$-olefin is more preferably formed here by ethylene, propylene or 1-butene. In a particular preferred embodiment the TPO is formed by a polyolefin composition, comprising: A) 20 to 50 parts by weight of a crystalline polypropylene polymer with an isotacticity index higher than 80 which is selected from a polypropylene homopolymer and polypropylene copolymers comprising 0.5 to 15 mol % ethylene and/or an $\forall$-olefin with 4 to 10 carbon atoms, wherein the polypropylene polymer has a molecular weight distribution (MWD) greater than 3.5; and B) 50 to 80 parts by weight of an elastomeric ethylene copolymer with olefins $CH_2$=CHR, wherein R is an alkyl with 1 to 10 carbon atoms, which optionally comprises minor quantities of units derived from a polyene, wherein the copolymer comprises 40 to 70% by weight of units derived from ethylene and 30 to 60% by weight of units derived from an $\forall$-olefin, and has the following characteristics: a) a molecular weight distribution of less than 3.5, b) a crystallinity content, expressed as the enthalpy of fusion, lower than 20 J/g and c) a content of 2-1 regio-inversions of the $\forall$-olefin units lower than 5%. Further advantageous embodiments are described in EP 0770106, the content of which forms part of this patent specification by way of reference. In another particular preferred embodiment the TPO is formed by a polyolefin composition, comprising: A) 10-50 parts by weight of a homopolymer of polypropylene with an isotactic index higher than 80 or a copolymer of polypropylene with ethylene, a $CH_2$=CHR $\forall$-olefin, wherein R is an alkyl group with 2-8 carbon atoms, or a combination thereof, the copolymer comprising more than 85% by weight polypropylene; B) 5-20 parts by weight of a copolymer fraction comprising ethylene, insoluble in xylene at ambient temperature; C) 40-80% by weight of a copolymer fraction of ethylene and polypropylene or another $CH_2$=CHR $\forall$-olefin, wherein R is an alkyl group with 2-8 carbon atoms, or combination thereof with optionally a small quantity of diene which comprises less than 40% by weight ethylene, which fraction is soluble in xylene at ambient temperature and with an intrinsic viscosity of 1.5-4 dl/g; wherein the percentage by weight of the sum of the (B) and (C) fractions in respect of the overall polyolefin composition is 50-90% and the weight ratio (B)/(C) is lower than 0.4, the polyolefin composition being obtainable by applying a polymerization catalyst comprising the reaction product of a solid component comprising a titanium compound and an electron donor compound supporting on magnesium chloride, with an Al trialkyl compound and an electron donor compound. Further advantageous embodiments are described in EP 0472946, the content of which forms part of this patent specification by way of reference. Examples of commercially available TPOs are Hifax®, in particular Hifax® 7334 XEP, Adflex®, in particular Adflex® X500F, and Softell® obtainable via LyondellBasell. It is otherwise also possible to envisage further providing an outer surface of the capsule with at least one other type of sealing element for the purpose of sealing the capsule in the device.

The housing can be manufactured from diverse materials, including aluminium and/or plastic, in particular polypropylene (PP). When a plastic housing is applied, the housing will generally be manufactured from a laminate of a plurality of plastic layers, such as PP and ethylene vinyl alcohol (EVOH). When an aluminium housing is applied, it is generally also usual to laminate the aluminium with one or more additional layers, including a protective lacquer coating in order to avoid direct contact of aluminium with the beverage to be prepared, and including for instance a PP layer to enable realization of an (ultrasonic) welded connection to the foil. The foil generally also comprises aluminium which is optionally provided on one or two sides with a PP layer in order to facilitate one or two-sided adhesion of the foil. It is also possible to envisage the foil comprising aluminium oxide (ALOX), optionally laminated with plastic such as polyethylene terephthalate (PET), whereby an exceptionally thin foil can be obtained with a thickness in the order of magnitude of several microns. The foil is generally connected by means of welding and/or adhesion to the engaging edge, in particular to a flange forming part of the housing.

In an embodiment of the capsule the at least one sealing element is arranged releasably round the housing and/or is connected releasably to the engaging edge and/or the housing, whereby it is not necessary to modify the production lines for the capsules, this being particularly advantageous from an economic viewpoint. The type, in particular the thickness, of the sealing element to be applied can moreover be adapted to the (most likely) device in which the capsule is going to be used. The arranging of the sealing element can take place by machine during the production process. It is however also possible to envisage this arrangement taking place manually, optionally by the consumer him/herself, whereby he/she can have the type of sealing element to be applied depend on the type of device (coffee machine) the consumer in question is using. A further advantage of the sealing element is that the choice of material and shape can be optimized in relatively simple manner for the purpose of realizing a liquid-tight, in particular medium-tight, seal during the preparation process. The sealing element arranged releasably round the housing will generally exert a bias on an outer side of the housing, whereby undesirable removal of the sealing element from the housing can be countered as far as possible. It is also possible to envisage having the sealing element held by the engaging edge and/or the housing, for instance by applying holding elements such as hooks or other locking protrusions.

The sealing element will however generally be connected non-releasably to the engaging edge and/or the housing. This connection will then preferably be realized by means of welding.

The sealing element will generally wholly enclose the periphery of the housing of the capsule and can for instance take the form of an O-shaped or L-shaped ring. It is also possible to envisage the sealing element enclosing the engaging edge multilaterally, whereby a multilateral, particularly two-sided seal can be realized.

The foil can seal a discharge side or a supply-side of the capsule, depending on the type of capsule. The foil can already be provided here before use with perforations which have a size such that liquid can be allowed through and solid parts are held back. The foil thus has a filtering action in this case. Such a filter foil need not necessarily be perforated in the capsule holder and can also be positioned such that the filter foil remains intact. When the filter foil remains intact, it is possible to envisage applying a relatively thick and therefore strong and relatively rigid foil with a thickness of for instance 0.5-3 mm.

The foil can also be adapted for substantially medium-tight sealing of the housing of the capsule. The foil will have to be perforated here in the capsule holder to enable inflow and/or outflow of liquid. It is favourable here to apply thinner foils with a thickness in the order of magnitude of microns. In a preferred embodiment the capsule comprises a perforation structure coupled substantially rigidly to the engaging edge and/or the housing and/or the foil and provided with at least one perforation element facing toward the foil for perforating the foil, which perforation structure is positioned substantially on a side of the foil remote from the housing, wherein perforation of the foil is caused by deformation of the foil during pressing of the liquid through the capsule. By providing the capsule with its own perforation structure for perforating the foil a conventional perforation plate forming part of the device is no longer required. The advantage hereof is that the prepared beverage need no longer be pressed through the conventional perforation plate of the device, but can optionally be delivered directly from the capsule to a drinking cup. This can drastically reduce the beverage residue left behind in the device, this being advantageous from a hygiene viewpoint and reducing the required maintenance on the device. It is moreover possible in this way to prevent, or at least counter, beverage pressed out of the capsule mixing with beverage residues coming from one or more already used capsules and already present in the device, whereby the taste of the beverage to be prepared can be guaranteed as fully as possible. The perforation structure will be connected substantially rigidly (non-displaceably) to the housing, whereby the external dimensioning of the capsule must generally be smaller than or the same as a volume enclosed by the capsule holder. The perforation structure will generally be provided with one or more throughflow channels or throughfeed openings extending between a side of the perforation structure facing toward the foil and a side of the perforation structure remote from the foil. The particular advantage here is that the number of throughflow channels to be applied and the dimensioning of these throughflow channels can be wholly adapted to the nature of the beverage to be prepared, wherein the intensity of the aeration, the extent of the pressure buildup and the swirling of the beverage pressed out of the capsule can be regulated, which can considerably enhance the taste sensation during consumption of the beverage. Because the foil will be perforated by the generally pointed perforation elements and will be pressed during use against the perforation structure, a filtering action will be realized, whereby solid constituents such as coffee dregs can be kept in the housing. The supply side will otherwise generally take a closed form initially, wherein the supply side will be perforated in the device during use. It is also possible to envisage the supply side already being pre-perforated during the production process, whereby further perforation in the device can be dispensed with. The drawback hereof is however that the capsule generally has to be packaged in order to enable a sufficiently long shelf-life of the substance, and therefore of the capsule. Initial, substantially hermetic sealing of the capsule is generally recommended, wherein the capsule can optionally be filled with an inert gas, such as nitrogen or carbon dioxide, in order to further increase the shelf-life of the substance. The result hereof is that a slight overpressure of several hundred millibar will generally be present in the capsule. This overpressure can possibly increase to some extent if coffee powder, which naturally generates a limited amount of gas, is received in the capsule.

The perforation structure usually takes a plate-like form in order to limit the volume taken up by the capsule. The perforation structure is preferably positioned at least partially in a volume enclosed by the housing. The advantage hereof is that the dimensioning of the housing need not be adapted to the standard dimensioning of a capsule and capsule holder, this being advantageous from an economic point of view. It is advantageous here for the perforation structure to connect substantially seamlessly to the engaging edge, wherein the perforation structure can even form an integral part of or be integrally connected to at least a part of the engaging edge. It is a further advantage that a side of the perforation structure remote from the foil and a side of the engaging edge are located in the same plane, so that a completely flat underside of the capsule can in fact be realized. The housing and the perforation structure are generally positioned initially on either side of a plane defined by (a central part of) the foil. A suitable material for a perforation structure is plastic, such as for instance PP or polyethylene (PE).

The engaging edge generally comprises at least one flange connected integrally to the housing. It is also possible to envisage the flange being chemically and/or mechanically connected to an inner side and/or outer side of the housing. The engaging edge will usually be constructed in laminated manner from at least one flange connected to the housing and a support structure coupled to the flange, the support structure being optionally integrally connected to the perforation structure. An edge periphery of the perforation structure is optionally connected via at least one connecting element to the engaging edge. The support structure will generally take a substantially annular form here, because the flange will usually have the same shape. It is possible here to envisage the support structure at least partially enclosing, and even being able to clamp, the flange. It is also possible to envisage welding and/or adhering the support structure to the flange, usually with interposing of the foil. The support structure can be constructed from a plurality of parts which are mutually connected during the production process, for instance by means of welding or adhesion.

The perforation structure and the support structure are preferably manufactured at least partially from the same material, such as polypropylene, in order to enable realization of a reliable mutual connection. As already stated, it is also possible to envisage the perforation structure and the support structure being integrally connected to each other and being manufactured in the same production step, for instance by means of injection moulding. The support structure can in fact be deemed here as an (integral) extension of the perforation structure. The support structure is preferably constructed here from a lower part initially connected directly to the perforation plate and an upper part connected to the lower part, wherein the lower part and the upper part are at least positioned at least partially on either side of the flange connected to the housing or forming part of the housing, whereby the flange is at least partially covered on an underside and an upper side by the support structure. The upper part of the support structure can be connected integrally to the lower part of the support structure, wherein the support structure is even manufactured from one material, in particular plastic, preferably polypropylene. The lower part of the support structure will however generally be adapted to initially hold (support) the perforation structure and the upper part of the support structure will generally be adapted as the sealing element manufactured at least partially from TPO. The advantage of a TPO is that a reliable sealing of the capsule in the capsule holder can be realized by means of such a material, wherein a reliable connection can moreover be realized between the lower part of the support structure and the upper part of the support structure.

Instead of connecting the perforation structure rigidly to the engaging edge and/or the housing and/or the foil, it is also possible to envisage the capsule comprising a perforation structure coupled to the engaging edge and/or the housing and provided with at least one perforation element facing toward the foil, this perforation structure being positioned substantially on a side of the foil remote from the housing, wherein the perforation structure is displaceable from a first position, in which the foil is substantially intact, to a second position in which the at least one perforation element perforates the foil, whereby discharge of liquid from the capsule is possible. Displacement of the perforation structure is generally realized by having the capsule clamped by a capsule holder of a device for preparing beverages, a conventional perforation plate forming part of the device no longer being required. In an embodiment the perforation structure is initially connected in the first position via at least one breakable connection to the engaging edge, wherein the perforation structure is displaceable to the second position by breaking the connection between the perforation structure and the engaging edge. In this embodiment the perforation structure will generally take a substantially rigid form. A suitable material for manufacturing such a substantially rigid perforation structure is for instance PP. The perforation structure is preferably initially positioned such that the connection between the engaging edge and the perforation structure will be broken during clamping of the capsule in the device. It is optionally also possible to envisage the connection being broken by the user him/herself by pushing the perforation structure in the direction of the foil. Instead of using a breakable connection it is also possible to envisage providing the engaging edge and/or the housing with a guide for co-action with the perforation structure, whereby the perforation structure can in fact be shifted from the first position to the second position.

In an advantageous embodiment the perforation structure is provided with a plurality of throughflow channels for discharge of liquid, the throughflow channels extending from a side of the perforation structure facing toward the foil to a side of the perforation structure remote from the foil. The perforation structure is generally also provided with a plurality of perforation elements. It is possible here to envisage at least a number of throughflow channels being located at a distance from the perforation elements. It is however also possible to envisage, and even advantageous, for at least one perforation element to be provided with one or more throughflow channels. It is found particularly advantageous in practice to apply a conical perforation element through which extend three throughflow channels which debouch in the cone wall, whereby blocking of the throughflow channels by perforated foil parts can be prevented.

For the purpose of being able to prevent blocking of an outer end of a throughflow channel by the device it is advantageous for a side of the perforation structure remote from the foil to be provided with at least one surface groove, the surface groove connecting to at least one outer end of at least one throughflow channel. It is further possible to envisage a side of the perforation structure remote from the foil being provided with a plurality of surface grooves, the surface grooves connecting the outer ends of the throughflow channels to each other. The surface grooves can connect to each other and intersect each other and in this way form a network.

The perforation elements must be sufficiently sharp to be able to perforate the foil. It is therefore advantageous that at least a number of perforation elements take a pointed, in particular pyramid-shaped and/or cone-shaped form. A cone-shaped (conical) shape is generally recommended above a pyramid-shaped embodiment, since the conical embodiment has a periphery varying less pronouncedly as seen in the height of the perforation elements, whereby the foil will tear and/or deform more gradually and therefore more easily.

An edge part of the perforation structure facing toward the foil is generally provided with one or more perforation elements for realizing an edge perforation in the foil. The perforation element can here form a cutting edge which can extend over the whole or partial edge part of the perforation structure. In addition, it is possible to envisage application of more centrally positioned perforation elements. In order to be able to guarantee a reliable perforation, it is generally advantageous that the foil initially engages under bias on at least one perforation element. This is because sufficient pressure buildup in the housing of the capsule will, as a result of the bias, result relatively quickly in perforation of the foil.

In an advantageous embodiment of the capsule a side of the perforation structure remote from the foil is provided with an upright sealing edge which protrudes in a direction away from the foil. This upright sealing edge provides on the one hand for an improved connection of the capsule to the device, and thereby for an improved sealing. The application of the upright sealing edge moreover makes the perforation structure stackable (nestable) with another perforation structure, this being particularly advantageous during the production process.

The invention also relates to an assembly of a capsule according to the invention and a device for preparing beverages, which device comprises a capsule holder for receiving the capsule. The capsule holder here preferably comprises a plurality of holder parts which are mutually displaceable between an opened state, in which the capsule can be placed in the capsule holder, and a closed state in which the engaging edge of the capsule is clamped substantially liquid-tightly by the holder parts.

The invention further relates to the use of a capsule according to the invention in a device for preparing beverages.

In addition, the invention relates to a sealing element evidently intended for use in a capsule according to the invention. The sealing element will generally be connected here to another part of the capsule by means of a welded connection.

BRIEF DESCRIPTION OF THE DRAWINGS

The invention will be elucidated on the basis of non-limitative exemplary embodiments shown in the following figures. Herein.

DESCRIPTION OF THE INVENTION

Figure 1A:
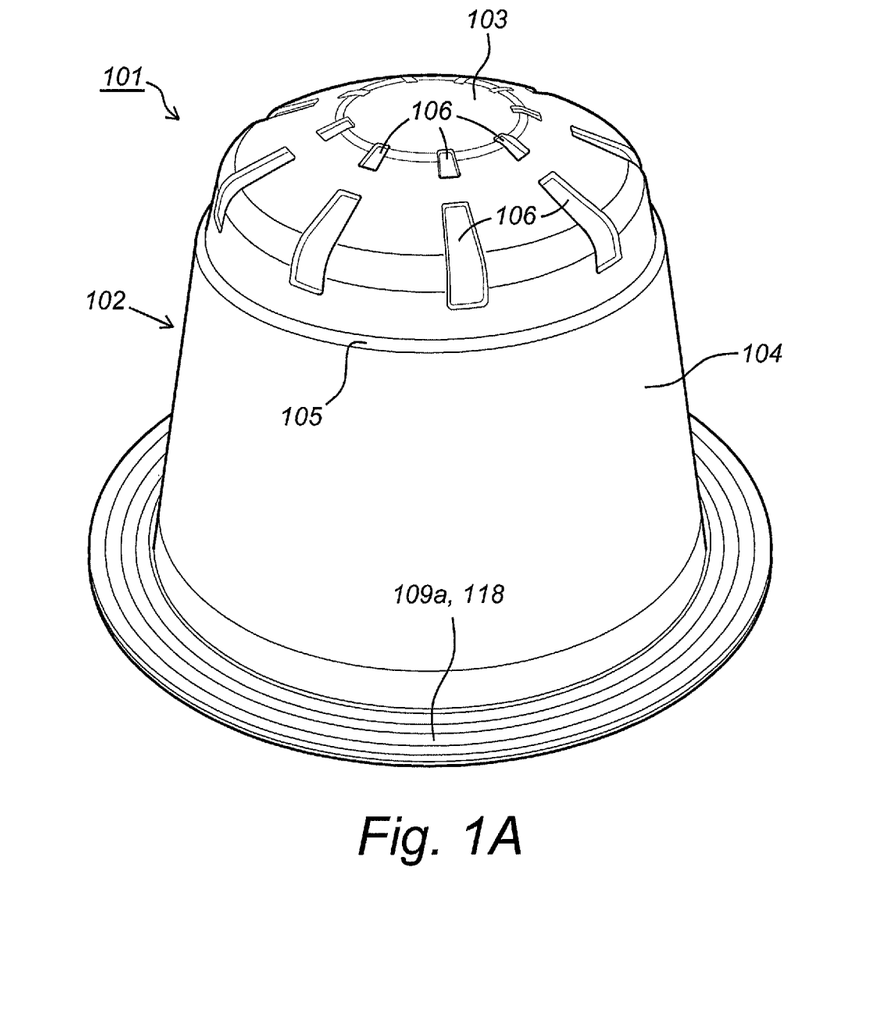
FIGS. 1a-1d show different views of a capsule according to the invention.
Figure 1B:
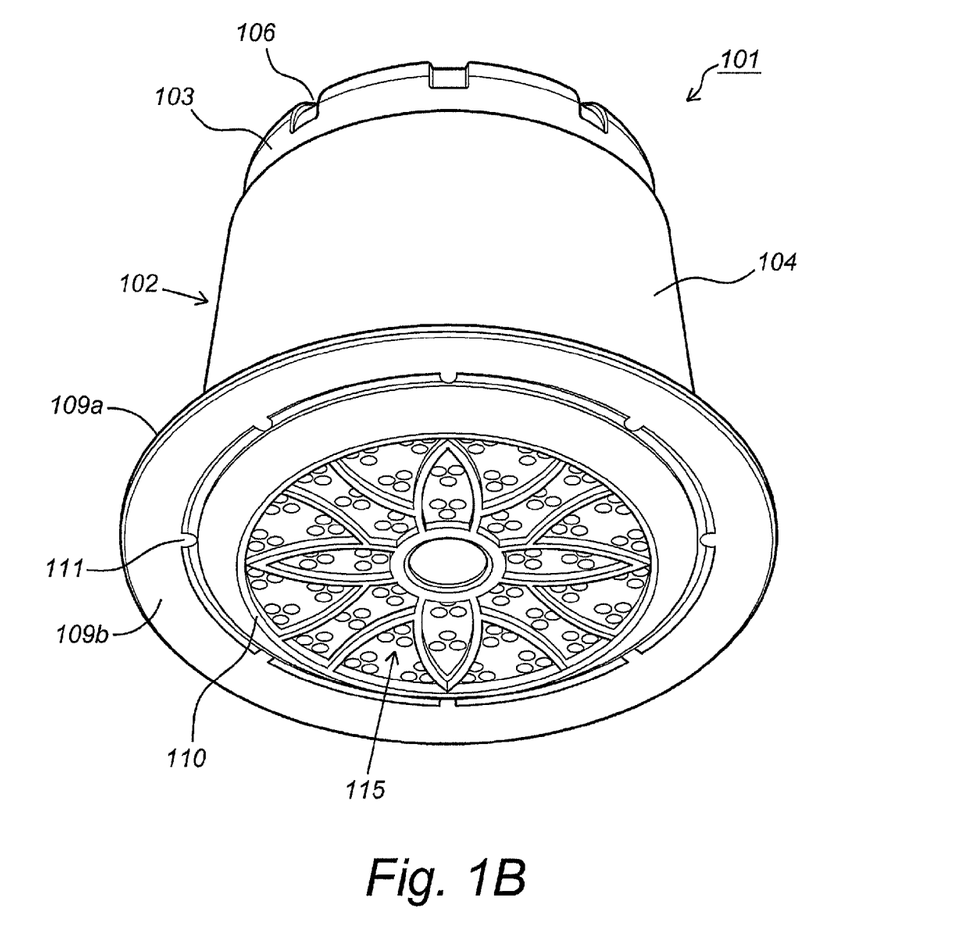
Figure 1C:
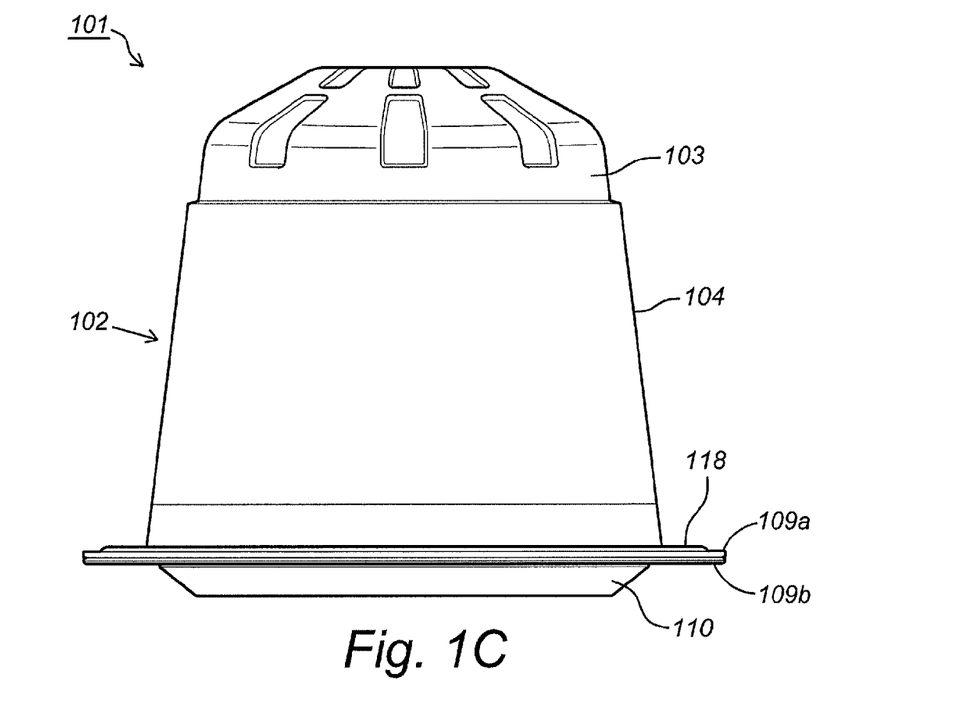
Figure 1D:
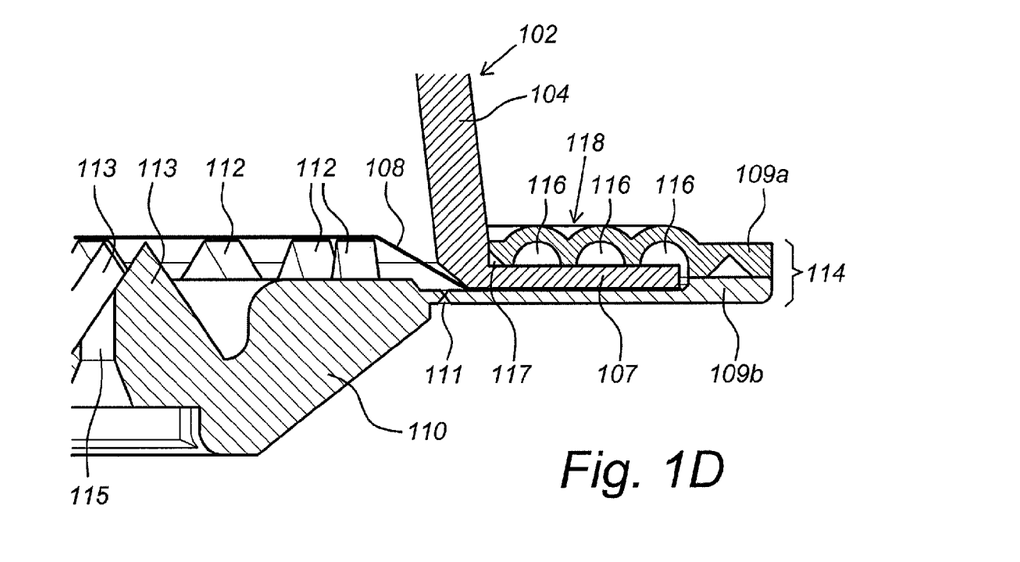

FIGS. 1a and 1b show different perspective views of a capsule 101 according to the invention, and FIG. 1c shows a side view of the same capsule 101. Capsule 101 comprises for this purpose a substantially frustoconical (truncated conical) housing 102 at least partially filled with a substance to be extracted and/or dissolved, such as ground coffee, tea, cocoa, milk powder and so on. Housing 102 comprises a perforable upper wall 103 which forms a supply side of capsule 101. The upper wall will be perforated in a capsule holder of a device for preparing beverages, after which water, in practice generally a mixture of water and air, is pressed into capsule 101 at a pressure of between 1 and 20 bar. Housing 102 also comprises a peripheral wall 104 (side wall) which is integrally connected to upper wall 103 and which tapers to some extent in the direction of upper wall 103, wherein in the shown situation peripheral wall 104 encloses an angle with the vertical lying between 5° and 7°, this angle of inclination corresponding to the complementary angle of inclination of a number of capsule holders available on the market, whereby the volume of housing 102 can generally be maximized. Peripheral wall 104 is provided with a ridge 105 to enable better fitting of capsule 101 on many of the known capsule holders. Housing 102 further comprises a plurality of strengthening elements 106 arranged recessed into upper wall 103 and/or peripheral wall 104. Strengthening elements 106 resist deformation of housing 2 as much as possible during use. In addition, housing 102 comprises a flange 107 which is integrally connected to the peripheral wall (see FIG. 1d) and which as such forms part of an engaging edge 114 of capsule 101, this engaging edge 114 being adapted to allow clamping of capsule 101 by the capsule holder. An inner edge of flange 107 does in fact define (a part of) the discharge side of capsule 101, this discharge side being initially sealed substantially medium-tightly by a foil 108 connected to flange 107. The connection between flange 107 and foil 108 is preferably realized by means of (ultrasonic) heat welding, whereby a relatively reliable connection can be realized between flange 107 and foil 108. It is advantageous here for the contact surfaces for fusing together to be manufactured from the same material, such as PP. Flange 107 is clamped by and/or enclosed by and/or connected to a support structure 109 for a plate-like perforation structure 110. In this exemplary embodiment support structure 109 has a modular construction of an upper part, formed by a sealing element 109a, and a lower part, formed by a holding element 109b, connected, preferably welded, to sealing element 109a for initially holding the perforation structure 110. Sealing element 109a of support structure 109 is adapted to seal capsule 101 in a capsule holder (see FIG. 2b), while lower part 109b of support structure 109 is in principle adapted to initially hold perforation structure 110. Sealing element 109a and holding element 109b can optionally be connected as separate elements to flange 107. Perforation structure 110 is connected by means of a plurality of breakable connecting elements 111 to support structure 109. As shown, housing 102 and perforation structure 110 are positioned on opposite sides of foil 108. In this exemplary embodiment, as shown in the cross-sections of FIGS. 2a and 2b, perforation structure 110 comprises a plurality of peripherally oriented ('peripheral') perforation elements 112 and a plurality of more centrally oriented ('central') perforation elements 113. All perforation elements 112, 113 have a pointed outer end directed toward foil 108 and are adapted to perforate foil 108. Most of the central perforation elements 113 are moreover each provided with three throughflow channels 115 extending from an upper side of perforation structure 110 to an underside of perforation structure 110 in order to enable discharge of water enriched with the substance, i.e. the prepared beverage, in capsule 101. As shown, all perforation elements 112, 113 protrude equally far, whereby the outer ends of perforation elements 112, 113 form a virtual plane. In the shown initial situation foil 108 engages on substantially all perforation elements 112, 113, such however that foil 108 remains intact (closed). By breaking the connections 111 between support structure 109 and perforation structure 110 the perforation structure 110 can be displaced from an initial position (first position) to a higher position (second position) in which perforation structure 110 at least partially perforates foil 108, whereby the discharge side of capsule 101 is in fact opened, and wherein perforation structure 110 comes to lie at least partially in a space enclosed by housing 102. Breaking the connections 111 can be realized by a user him/herself, but will in practice generally be realized in the capsule holder during closing of the capsule holder, and thereby clamping of capsule 101.

Figure 2A:
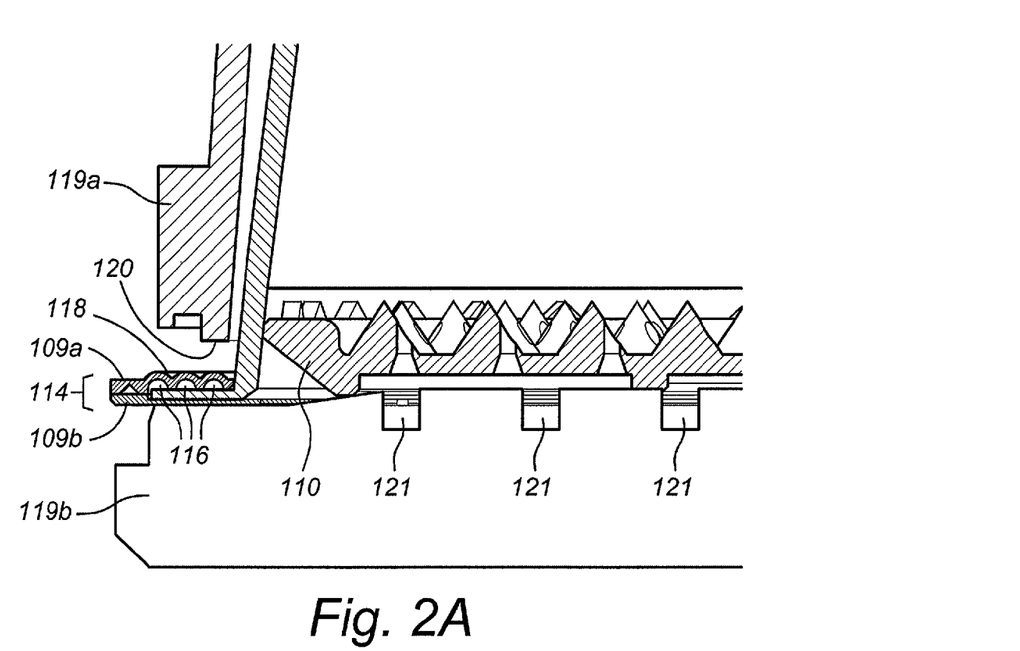
FIGS. 2a and 2b show different views of the capsule according to FIG. 1 and a capsule holder of a device for preparing beverages enclosing the capsule.
Figure 2B:
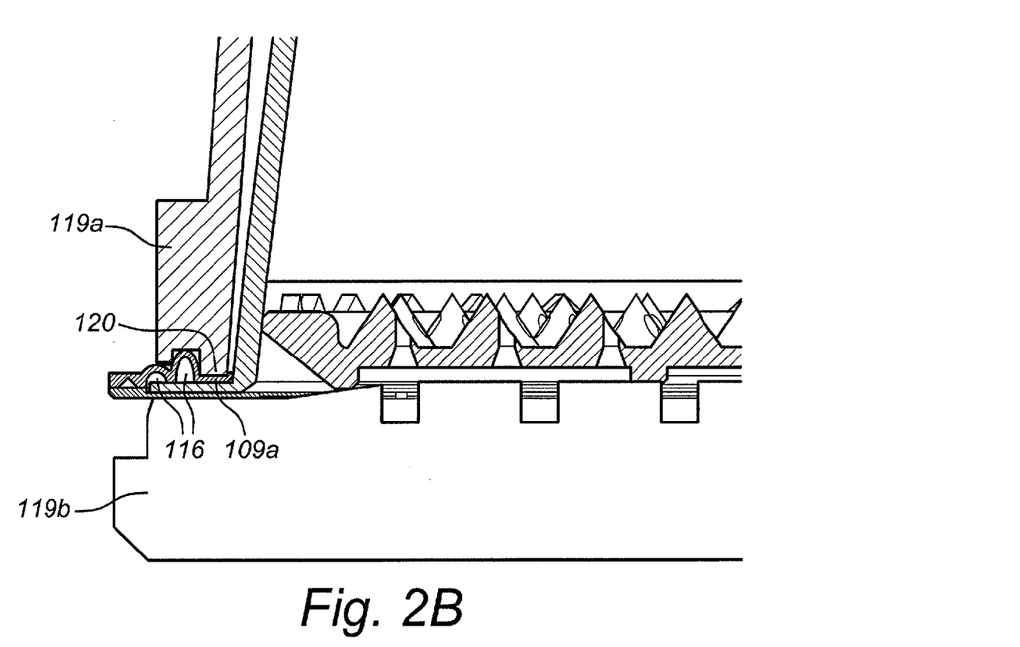

During clamping of capsule 101 in the capsule holder the breakable connection between support structure 109 and perforation structure 110 will in practice generally be broken and perforation structure 110 will be pushed in the direction of foil 108, whereby perforation elements 112, 113 will pre-perforate foil 108. The assembly of perforated foil 108 and perforation structure 110 will act here as filter, wherein beverage will be allowed through and solid parts, in particular residue, will be held back.

During the clamping particularly engaging edge 109 of capsule 101 is clamped in order to realize a seal between capsule 101 and the capsule holder. A special sealing element 109a is applied in the shown capsule 101 according to the invention. Sealing element 109a is of resilient nature and is provided with three annular absorption cavities 116 (see FIG. 1d). Absorption cavities 116 are further bounded here by flange 107. Sealing element 109a further encloses a further annular corner cavity 117, this corner cavity 117 being further bounded by flange 107 and peripheral wall 104 of housing 102. All cavities 116, 117 are adapted to facilitate deformation of sealing element 109a, whereby sealing element 109a can be pressed in simpler and better manner against the capsule holder, this enhancing the mutual sealing (see FIG. 2b). In the shown embodiment sealing element 109a is not connected to an upper side of flange 107, whereby the formed cavities 116, 117 can deform relatively easily. An (upper) side 118 of sealing element 109a remote from flange 107 follows the shape of the arcuate absorption cavities 116 and therefore takes a profiled form, whereby dam formation occurs which can further improve the sealing. Sealing element 109a is manufactured in this embodiment from a TPO. A reliable seal of the capsule in the capsule holder is realized due to the thermoplastic character of a TPO. Other than conventional thermosetting elastomers (rubber elastomers), thermoplastic polymers are manufactured using equipment suitable for processing resins. Thermoplastic polymers are quicker and easier to manufacture than thermosetting elastomers, which are manufactured in three lengthy steps (mixing, injection moulding and cross-linking). Other than thermosetting polymers, thermoplastic polymers can moreover be fully or partially recycled. Since lower part 109b of support structure 109 is generally manufactured at least partially from PP and ultrasonic welding is recommended to mutually connect holding element 109b and sealing element 109a, it is advantageous for a thermoplastic polypropylene-based elastomer, such as Adflex®, in particular Adflex® X500F, to be applied for the sealing element 109a.

FIG. 2a shows that capsule 101 is situated in an opened capsule holder 119 of a device for preparing beverages, in particular coffee. Capsule holder 119 here comprises a first holder part 119a and a second holder part 119b displaceable relative to first holder part 119a. First holder part 119a comprises one or more cutting elements (not shown) for perforating upper wall 103 of capsule 101. First holder part 119a further comprises a clamping edge 120 for pressing engaging edge 114 onto second holder part 119b such that capsule holder 119 is substantially completely sealed, whereby leakage of water can be prevented. Second holder part 119b is provided with one or more discharge openings 121 for beverage. During closing of capsule holder 119 by displacing first holder part 119a and second holder part 119b toward each other (see FIG. 2b) the upper wall 103 of capsule 101 will be perforated, engaging edge 114 will be clamped substantially liquid-tightly between the two holder parts 119a, 119b and perforation structure 110 will moreover be pressed into housing 102, whereby foil 108 will be at least partially perforated and discharge of beverage from capsule 101 is made possible. The advantage of this pre-perforation, among others, is that a better aeration of capsule 101 is obtained, this generally enhancing both the beverage preparation process and the finally obtained taste of the beverage. During this clamping the sealing element 109a will be clamped and deformed such that sealing element 109a exerts a lateral force on a longitudinal side of first holder part 119a, whereby the sealing of capsule 101 in capsule holder 119 is improved. As shown in FIG. 2b, an inner absorption cavity 116 is pressed empty here, whereby the other absorption cavities 116 swell and engage under bias on the first holder part 119a. The air present in these absorption cavities 116 can no longer escape because sealing element 109a is fully welded at a peripheral edge to the underlying holding element 109b, whereby the sealing action is maintained.

Figure 3:
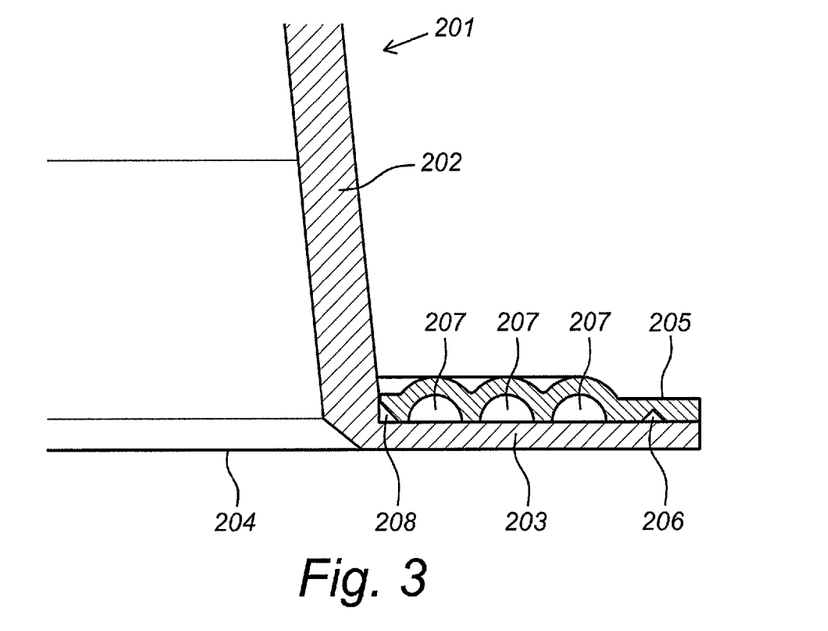
FIG. 3 shows a detailed cross-section of a part of another capsule according to the invention.

FIG. 3 shows a detailed cross-section of a part of another capsule 201 according to the invention. Capsule 201 comprises a housing 202 and a laterally protruding flange 203 integrally connected to housing 202. Housing 202 and flange 203 are manufactured by means of injection moulding or thermoforming from a material comprising PP and the housing has at least partially a frustoconical shape. The substantially rigid housing is partially or wholly filled with an extractable or soluble food product such as tea, instant soup, coffee, instant hot chocolate and so on. Housing 202 is closed by means of a foil 204. Foil 204 can seal housing 202 medium-tightly here, but can also be provided with (small) perforations whereby foil 204 can function as filter. Foil 204 is connected to flange 203, preferably by means of a welded connection. Arranged on a side of flange 203 remote from foil 204 is an annular resilient sealing element 205 which is welded at a peripheral edge to flange 203. In order to facilitate welding, flange 203 is provided with a ridge 206, also referred to as so-called energy ring. Sealing element 205 is manufactured from an elastomer. Sealing element 205 encloses together with flange 203 three absorption cavities 207 and encloses together with flange 203 and housing 202 an (optional) smaller corner cavity 208. These cavities 207, 208 facilitate deformation of sealing element 205, whereby sealing element 205 can fit better and/or more firmly onto a clamping edge of a capsule holder. An example hereof is shown in FIG. 2b.

Figure 4:
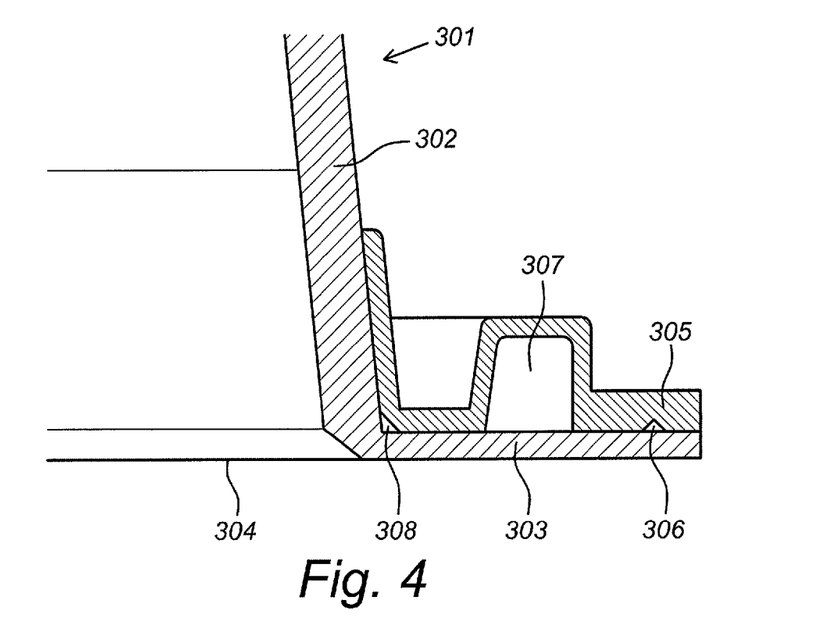
FIG. 4 shows a detailed cross-section of a part of yet another capsule according to the invention.

FIG. 4 shows a detailed cross-section of a part of another capsule 301 according to the invention. Capsule 301 comprises a housing 302 and a laterally protruding flange 303 integrally connected to housing 302. Housing 302 and flange 303 are manufactured by means of injection moulding or thermoforming from a material comprising PP and the housing has at least partially a frustoconical shape. The substantially rigid housing is partially or wholly filled with an extractable or soluble food product such as tea, instant soup, coffee, instant hot chocolate and so on. Housing 302 is closed by means of a foil 304. Foil 304 can seal housing 302 medium-tightly here, but can also be provided with (small) perforations whereby foil 304 can function as filter. Foil 304 is connected to flange 303, preferably by means of a welded connection. Arranged on a side of flange 303 remote from foil 304 is an annular resilient sealing element 305 which is welded at a peripheral edge to flange 303. In order to facilitate welding, flange 303 is provided with a ridge 306, also referred to as so-called energy ring. Sealing element 305 is manufactured from non-polymeric material having some degree of resilience, such as paper, cardboard, textile or metal. Sealing element 305 encloses together with flange 303 an absorption cavity 307 and encloses together with flange 303 and housing 302 an (optional) smaller corner cavity 308. These cavities 307, 308 facilitate deformation of sealing element 305, whereby sealing element 305 can fit better and/or more firmly onto a clamping edge of a capsule holder. Shown clearly in this example is that sealing element 305 engages not only on flange 303 but also on an outer side of housing 302, which can further improve the sealing effect.

Figure 5:
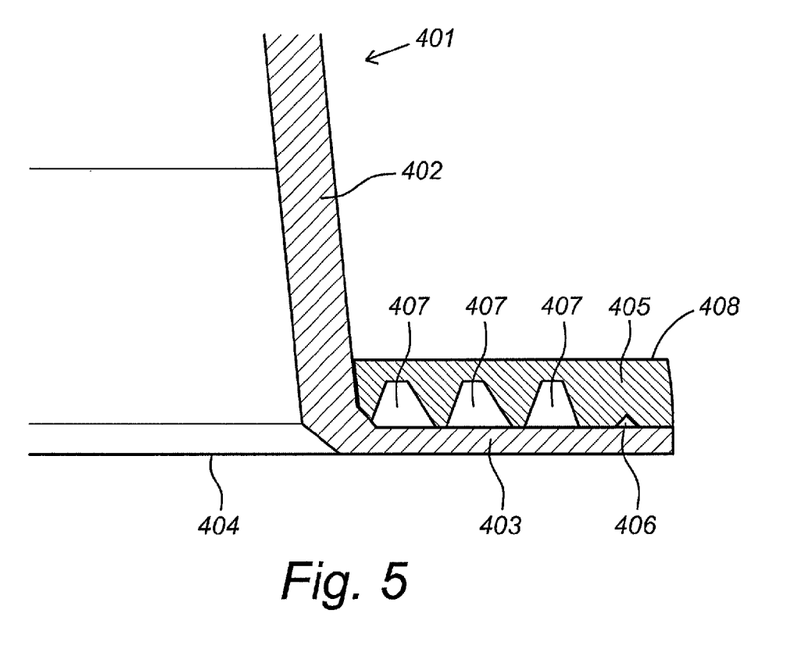
FIG. 5 shows a detailed cross-section of a part of still another capsule according to the invention.

FIG. 5 shows a detailed cross-section of a part of another capsule 401 according to the invention. Capsule 401 comprises a housing 402 and a laterally protruding flange 403 integrally connected to housing 402. Housing 402 and flange 403 are manufactured by means of injection moulding or thermoforming from a material comprising PP and the housing has at least partially a frustoconical shape. The substantially rigid housing is partially or wholly filled with an extractable or soluble food product such as tea, instant soup, coffee, instant hot chocolate and so on. Housing 402 is closed by means of a foil 404. Foil 404 can seal housing 402 medium-tightly here, but can also be provided with (small) perforations whereby foil 404 can function as filter. Foil 404 is connected to flange 403, preferably by means of a welded connection. Arranged on a side of flange 403 remote from foil 404 is an annular resilient sealing element 405 which is welded at a peripheral edge to flange 403. In order to facilitate welding, flange 403 is provided with a ridge 406, also referred to as so-called energy ring. Sealing element 405 is manufactured from a thermoplastic polymer, in particular copolymer of polypropylene and polyethylene. Sealing element 405 encloses together with flange 403 three absorption cavities 407. These cavities 407 facilitate deformation of sealing element 405, whereby sealing element 405 can fit better and/or more firmly onto a clamping edge of a capsule holder. Shown clearly in this example is that a side 408 of sealing element 405 remote from flange 403 takes a substantially flat form.

Figure 6:
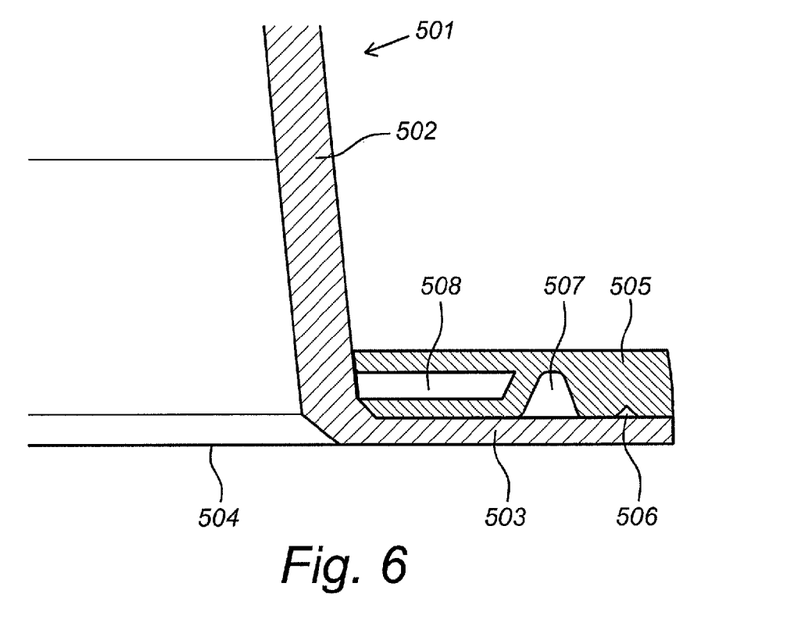
FIG. 6 shows a detailed cross-section of a part of a further capsule according to the invention.

FIG. 6 shows a detailed cross-section of a part of another capsule 501 according to the invention. Capsule 501 comprises a housing 502 and a laterally protruding flange 503 integrally connected to housing 502. Housing 502 and flange 503 are manufactured by means of injection moulding or thermoforming from a material comprising PP and the housing has at least partially a frustoconical shape. The substantially rigid housing is partially or wholly filled with an extractable or soluble food product such as tea, instant soup, coffee, instant hot chocolate and so on. Housing 502 is closed by means of a foil 504. Foil 504 can seal housing 502 medium-tightly here, but can also be provided with (small) perforations whereby foil 504 can function as filter. Foil 504 is connected to flange 503, preferably by means of a welded connection. Arranged on a side of flange 503 remote from foil 504 is an annular, at least partially elastic sealing element 505 which is welded at a peripheral edge to flange 503. In order to facilitate welding, flange 503 is provided with a ridge 506, also referred to as so-called energy ring. Sealing element 505 is manufactured from a thermoplastic polymer which partially deforms plastically during load. Sealing element 505 encloses together with flange 503 a first absorption cavity 507 and encloses together with housing 502 a second absorption cavity 508. These cavities 507, 508 facilitate deformation of sealing element 505, whereby sealing element 505 can fit better and/or more firmly onto a clamping edge of a capsule holder.

It will be apparent that the invention is not limited to the exemplary embodiments shown and described here, but that within the scope of the appended claims numerous variants are possible which will be self-evident to the skilled person in this field.

The invention claimed is:

1. A capsule for preparing beverages, comprising:
    a housing at least partially filled with a substance to be extracted and/or dissolved, wherein the housing is provided with a supply side for pressing a liquid such as water into the capsule, and with a discharge side located a distance from the supply side for discharging liquid containing extract and/or dissolved substance and guided through the capsule, wherein the supply side and/or the discharge side of the housing is initially sealed by a foil;
    a laterally protruding engaging edge connected to the housing to enable clamping of the capsule in a capsule holder of a device for preparing beverages; and
    at least one annular resilient sealing element arranged at least on the engaging edge and/or the housing for sealing a space between the capsule holder and the capsule during clamping of the capsule in the capsule holder, wherein at least one absorption cavity is formed by an annularly extending groove and is wholly enclosed by at least the sealing element.

2. The capsule as claimed in claim 1, wherein the at least one absorption cavity is wholly enclosed by the sealing element and the engaging edge and/or the housing.

3. The capsule as claimed in claim 1, wherein a part of the sealing element enclosing the at least one absorption cavity is provided with at least one weakening zone.

4. The capsule as claimed in claim 1, wherein the at least one absorption cavity is a plurality of absorption cavities and the sealing element at least partially encloses some of the plurality of absorption cavities.

5. The capsule as claimed in claim 1, wherein an absorption cavity of the at least one absorption cavity is filled with air.

6. The capsule as claimed in claim 5, wherein the at least one absorption cavity comprises at least two absorption cavities at least one of said absorption cavities which is in communication with the atmosphere surrounding the capsule.

7. The capsule as claimed in claim 1, wherein an absorption cavity of the at least one absorption cavity is at least partially filled with liquid and/or gel.

8. The capsule as claimed in claim 1, wherein an absorption cavity of the at least one absorption cavity is given a bubble-like form.

9. The capsule as claimed in claim 1, wherein the resilient sealing element is manufactured at least partially from a porous material.

10. The capsule as claimed in claim 1, wherein a side of the sealing element remote from the engaging edge is provided with at least one protruding edge.

11. The capsule as claimed in claim 10, wherein a side of the sealing element remote from the engaging edge is provided with a plurality of protruding edges.

12. The capsule as claimed in claim 11, wherein the protruding edges are oriented concentrically relative to each other.

13. The capsule as claimed in claim 1, wherein the sealing element forms at least a part of the engaging edge.

14. The capsule as claimed in claim 1, wherein the sealing element forms at least a part of the housing.

15. The capsule as claimed in claim 1, wherein the sealing element is at least partially manufactured from a thermoplastic polyolefin (TPO).

16. The capsule as claimed in claim 15, wherein the sealing element comprises a composition of polyolefins, the composition comprising: polypropylene and an elastomeric copolymer comprising units of ethylene and units of an α-olefin.

17. The capsule as claimed in claim 15, wherein the sealing element is at least partially manufactured from polypropylene.

18. The capsule as claimed in claim 1, wherein the sealing element is connected non-releasably to another part of the capsule.

19. The capsule as claimed in claim 18, wherein the sealing element is welded to another part of the capsule.

20. The capsule as claimed in claim 1, wherein the sealing element is arranged releasably on another part of the housing.

21. The capsule as claimed in claim 1 wherein foil is adapted as a filter.

22. The capsule as claimed in claim 1, wherein the foil initially seals the housing substantially tightly, such that the foil deforms under pressure.

23. The capsule as claimed in claim 22, wherein the capsule comprises a perforation structure coupled substantially rigidly to the engaging edge and/or the housing, which perforation structure is provided with at least one perforation element facing toward the foil for perforating the foil, and which perforation structure is positioned substantially on a side of the foil remote from the housing, wherein perforation of the foil is caused by deformation of the foil during pressing of the liquid through the capsule.

24. The capsule as claimed in claim 23, wherein the perforation structure is positioned at least partially in a volume enclosed by the housing.

25. The capsule as claimed in claim 23, wherein the capsule comprises a perforation structure coupled to the engaging edge and/or the housing and provided with at least one perforation element facing toward the foil, which perforation structure is positioned substantially on a side of the foil remote from the housing, and which perforation structure is displaceable from a first position, in which the foil is substantially intact, to a second position in which the at least one perforation element perforates the foil, whereby discharge of liquid from the capsule is possible.

26. The capsule as claimed in claim 25, wherein the perforation structure is initially connected in the first position via at least one breakable connection to the engaging edge, wherein the perforation structure is displaceable to the second position by breaking the connection between the perforation structure and the engaging edge.

27. The capsule as claimed in claim 26, wherein the at least one breakable connection is rigid and resists bending by light hand pressure.

28. The capsule as claimed in claim 26, wherein the perforation structure is initially positioned such that the connection between the engaging edge and the perforation structure will be broken during clamping of the capsule in the device.

29. An assembly of a capsule as claimed in claim 1 with a device for preparing beverages, which device comprises a capsule holder for receiving the capsule.

30. The assembly as claimed in claim 29, wherein the capsule holder comprises a plurality of holder parts which are mutually displaceable between an opened state, in which the capsule can be placed in the capsule holder, and a closed state in which the engaging edge and the sealing element of the capsule are clamped substantially liquid-tightly by the holder parts.

* * * * *